May 31, 1955  M. J. TOTH ET AL  2,709,502
MULTI-STAGE PURIFIER

Filed Oct. 9, 1952  4 Sheets-Sheet 1

INVENTORS
MICHAEL J. TOTH
DONALD R. SNOKE
BY
Hyde, Meyer, Baldwin & Doran
ATTORNEYS

INVENTORS
MICHAEL J. TOTH
DONALD R. SNOKE
BY
ATTORNEYS

INVENTORS
MICHAEL J. TOTH
DONALD R. SNOKE

May 31, 1955  M. J. TOTH ET AL  2,709,502
MULTI-STAGE PURIFIER
Filed Oct. 9, 1952  4 Sheets-Sheet 4

INVENTORS
MICHAEL J. TOTH
DONALD R. SNOKE
BY
Hyde, Meyer, Baldwin & Doran
ATTORNEYS

United States Patent Office 2,709,502
Patented May 31, 1955

2,709,502

MULTI-STAGE PURIFIER

Michael J. Toth, Cleveland, and Donald R. Snoke, Bedford, Ohio, assignors to The V. D. Anderson Company, Cleveland, Ohio, a corporation of Ohio Application October 9, 1952, Serial No. 313,842

12 Claims. (Cl. 183—92)

This invention relates to a novel and improved multi-stage centrifugal separator of the non-rotative type for the purification of steam or other gaseous fluid currents by removal of entrained solid or liquid particles. While, as will be apparent to those skilled in the art, the invention may be utilized for the separation of objectionable substances from a wide variety of gaseous fluids it will be herein described as applicable to the removal of moisture from steam, and will be hereinafter occasionally referred to as a "purifier."

The principal object of the invention is to provide means for producing an exceptionally high quality vapor which, upon leaving our purifier, contains an extremely low solid or liquid content, in the order of 1 part in a million, or even less.

A further object of the invention is to provide a purifier of the character defined in the last preceding paragraph, which eliminates the need of internal baffling in drums and evaporators, such internal baffling being needed in previous single installations. Internal baffles are expensive and difficult to install, and they prevent easy access to the interior of the drum or vapor enclosure.

Since, as will appear, our purifier is of a multi-stage construction, the efficiency of each stage is arithmetically compounded in calculating the eventual efficiency of the purfier, and if we assume, as evidenced by the actual facts, that one stage has an efficiency of 99%, the efficiency of two stages in tandem is 99% plus 99% of 1% or 99.99%.

While multi-stage separators have been used in tandem heretofore, the structure now to be described, and hereinafter claimed, comprises an entirely novel arrangement of parts which contribute, in combination, to produce the improved results.

Additional advantages of our invention will be apparent from a study of the following description, in conjunction with the accompanying drawings, in which Fig. 1 is a vertical sectional view, with parts broken away, through an evaporating chamber, showing our multi-stage purifier in side elevation.

Figs. 2 and 3 are sectional views taken respectively on the lines 2—2 and 3—3 of Fig. 1.

Figure 1:
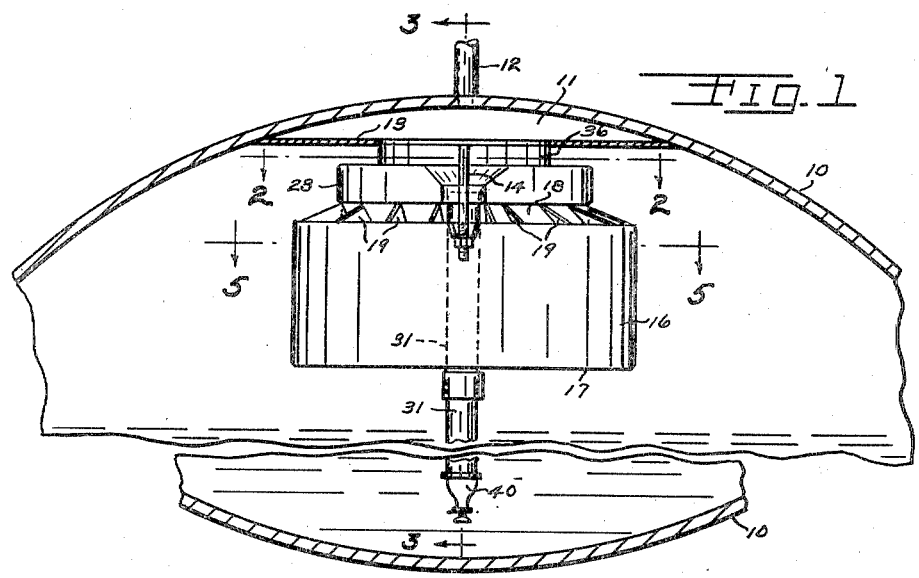

The multi-stage purifier now to be described is located near the steam outlet of an evaporator, steam drum, or boiler 10, Fig. 1, there being a steam manifold 11 disposed along the top of the drum into which the purified steam enters, thereafter leaving by the steam outlet pipes 12. The purifier in the embodiment shown is suspended from the bottom plate 13 of the manifold by bolts 14 which pass through lugs 15 on the outer wall of the purifier.

The three stages of the purifier are represented by two separate and distinct sets of blades or vanes and one intermediary chamber through which the steam to be purified passes in succession. The vanes are disposed and supported as follows.

Figure 2:
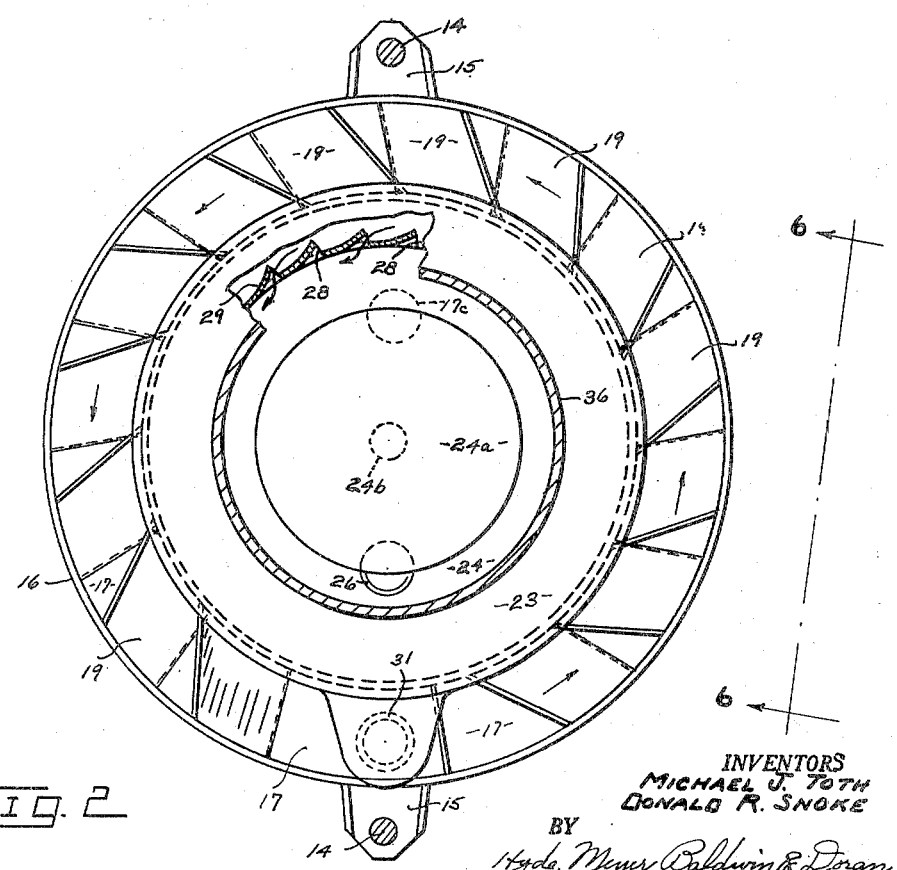
Figure 3:
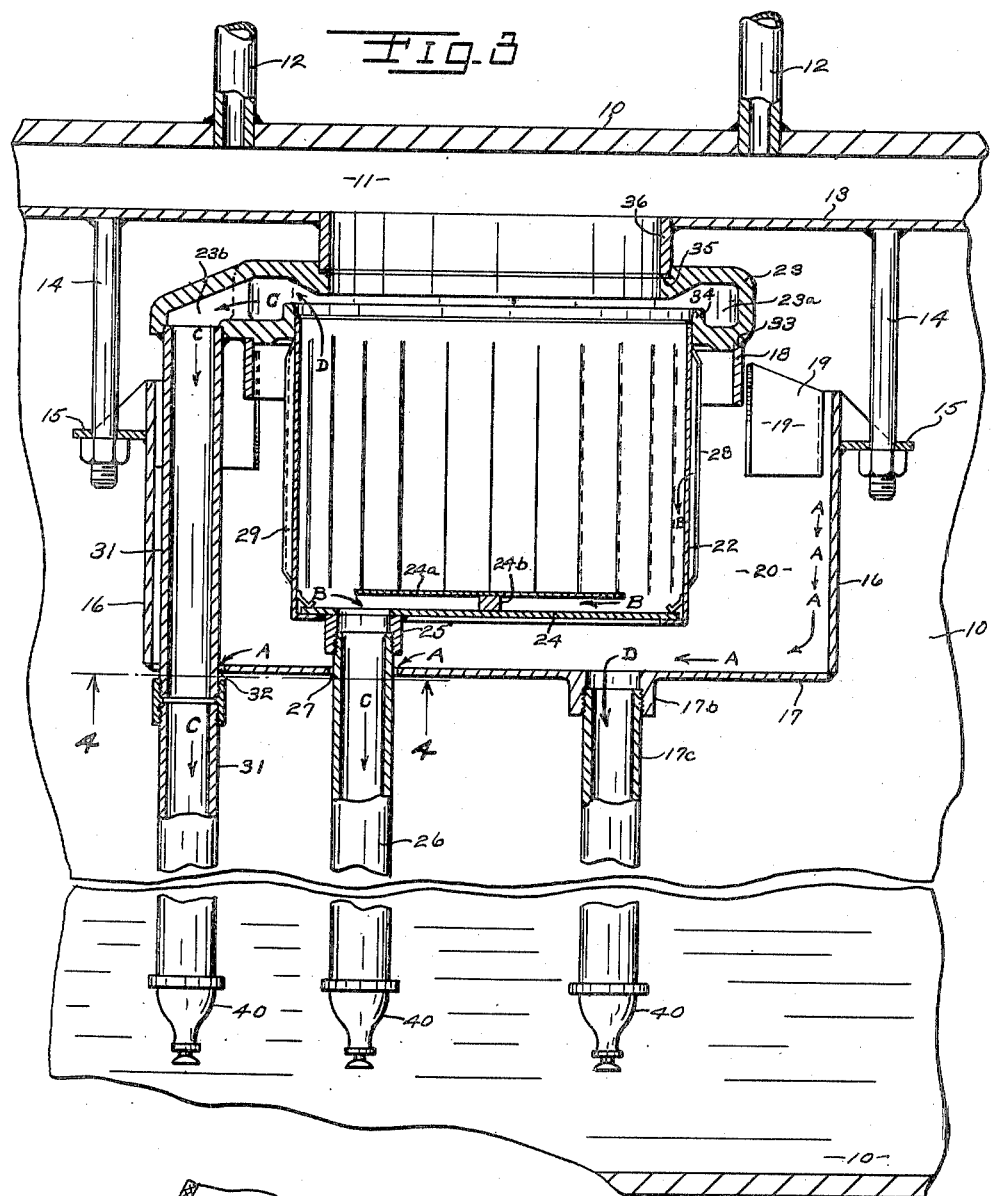
Figure 4:
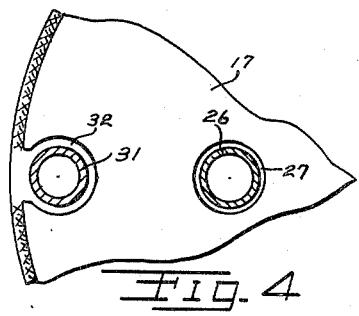
Fig. 4 is a detail sectional view taken on the line 4—4 of Fig. 3.
Figure 5:
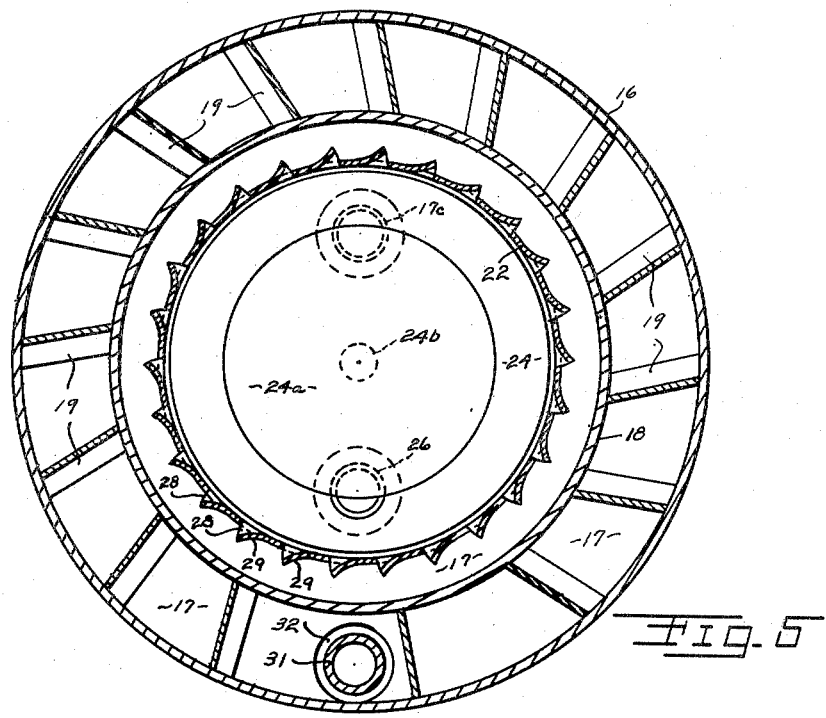
Fig. 5 is a sectional view taken on the line 5—5 of Fig. 1.
Figure 6:
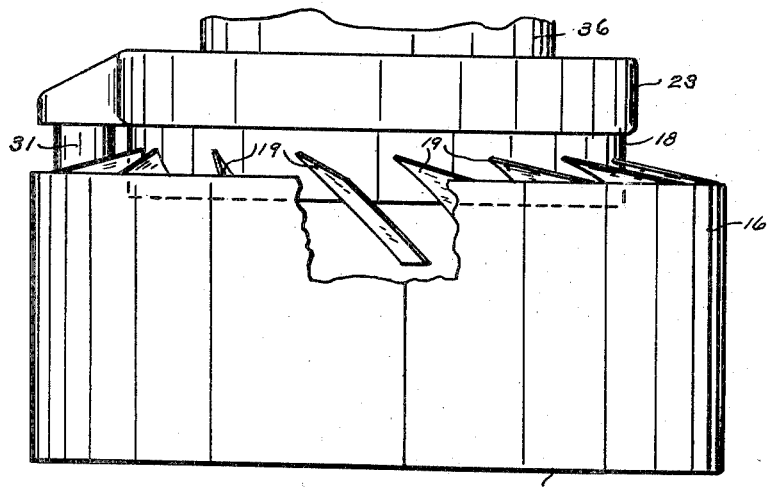
Fig. 6 is a somewhat enlarged side elevational view of the purifier with a part of the housing broken away to show internal structure.

Referring particularly to Fig. 3, the outer cylindrical housing 16 of the purifier is suspended from the lugs 15, and is substantially completely closed at the bottom by the disk shaped floor 17, having a bored boss 17b therein from which depends a drain pipe 17c. A second cylinder 18 is disposed co-axially with housing 16 and spaced inwardly therefrom, and upwardly from floor 17. Extending between cylinder 18 and the upper portion of housing 16 is a circumferentially spaced series of blades 19 constituting the first separator stage. They extend completely across the annular space defined by the said members 16 and 18, their outer and inner edges being welded or otherwise attached to the respective cylinder 18 and housing 16. They are inclined angularly downwardly and forwardly in a windmill pattern as best seen in Figs. 1, 2 and 6. In the embodiment shown the angle is approximately 45° to a vertical axial plane.

The chamber 20 located under cylinder 18 and blades 19 and between housing 16 and inner cylinder 22 constitutes the second separator stage. The significance of the juxtaposition of the various structural features so far described will later appear in conjunction with our description of the operation thereof.

Coaxial with the outer cylinder or housing 16, and with the intermediate cylinder 18, is an inner cylinder 22, which extends downwardly from an outlet housing 23 to be more fully described below. In the embodiment shown this inner cylinder 22 has a bottom plate 24 provided with a bored boss 25 from which a drain pipe 26 extends downwardly through floor plate 17 into the liquid in the drum, and a secondary bottom plate 24a located above plate 24 by means of support 24b. There is a narrow clearance annulus 27 between the pipe 26 and plate 17. Another outlet port is provided in plate 17 surrounding drain pipe 31.

Cylinder 22 is provided with a vertical series of slots 28 conveniently formed by outwardly deforming and perforating the cylinder wall as best seen in Figs. 2 and 3. This affords a peripherally spaced set of louvers 29 having a tangential inclination to the cylinder wall, and constituting the third separator stage.

Intermediate cylinder 18 carries at its upper end the member 23 herein for convenience termed an outlet housing. It is a generally ring-shaped member having a peripheral channel or race 23a (Fig. 3) which has an outlet port 23b in communication with a drain pipe 31 which extends downwardly at one side, between cylinders 16 and 18, and through plate 17 into the liquid source in the drum. There is an annular clearance opening 32 between plate 17 and pipe 31.

Cylinder 18 is welded at its top edge to a suitable rabbeted seat 33 extending peripherally around the outlet housing. Cylinder 22 is welded around its top edge to the inner peripheral flange 34 within the outlet housing. Extending downwardly from plate 13 is a short tubular section 36 which seats in a rabbeted peripheral groove in an overhanging lip 35 in the outlet housing. Speaking first generally, it will be evident that a gaseous fluid current arising from the interior of cylinder 22 passes unobstructedly through the large central opening in the annular outlet housing and through tubular section 36 into the manifold 11 and that the race 23a is open to access by the passing fluid current. It will also be evident that such fluid current, which happens to be steam in the example we have been discussing, when produced within the drum 10, flows into the purifier between the blades 19, proceeds downwardly and spirally inwardly through chamber 20, inwardly through the slots 28 in louvers 29, and finally upwardly within cylinder 22 into manifold 11 and out through pipes 12.

More specifically, the purifying effect of the structure above described is as follows, reference still being had to removal of moisture or other entrained particles from steam.

The steam from drum 10 passes between blades 19. The specific angular inclination of the blades imparts a whirling motion to the gaseous stream and a centrifugal effect develops which throws the entrained particles outwardly against the inner surface of cylinder 16. The coalesced moisture flows downwardly (arrows A) and along bottom plate 17 as far as port P and annnular openings 27, 32 around the respective pipes 26, 31, the liquid then dropping to the bottom portion of drum 10. This is the first stage of purification.

The gaseous stream, in seeking a discharge outlet, next passes spirally inward through chamber 20 at a reduced velocity. The change in direction of flow and reduction of velocity causes additional moisture droplets to fall out on to plate 17 and flow to port P and openings 27 and 32. This is the second stage of separation.

The gaseous stream, upon passage through chamber 20 has lost a large proportion of its original whirling velocity, but its next avenue of escape, namely through louver slots 28, re-establishes the whirling velocity within cylinder 22. Contact of the stream with the louvers removes the heavier components of any entrained material (arrows B) which flows under plate 24a along plate 24 and discharges through pipe 26. The presence of plate 24a eliminates the interference of the whirling mass of vapor with liquid drainage through port 25. The whirling movement of the stream persists, as the stream ascends within cylinder 22. As can best be seen in Fig. 3, the overhanging peripheral lip 35 intercepts the whirling stream, and directs any small remaining component of entrained material outwardly into the annular race 23a, such material being directed eventually towards pipe 31 (arrows C) and downwardly as before. This actually provides a fourth stage of separation.

The devices 40 shown on the lower ends of drain pipes 17c, 26, and 31 are novel and improved check valves especially adapted for use with this apparatus to prevent a possible inrush of water on drop of pressure in the separator. They are more fully described in our copending application, Serial Number 355,954, filed May 19, 1953.

The apparatus described hereinabove is exceptionally compact and efficient, and the elements can be fabricated from readily available simple structural shapes, such as sheet metal flats and tubing. The outlet housing is a simple casting. In this compact assembly there are four stages of separation yielding an extremely high efficiency. As previously indicated, while we have described its use in removing liquid particles from steam, it is equally effective in removing entrained particles of any kind from any type of gaseous stream.

This apparatus can be further designed to permit disassembling for passage of its component parts through standard manways or access openings in steam drums, evaporators, and similar tanks and receivers.

Figure 7:
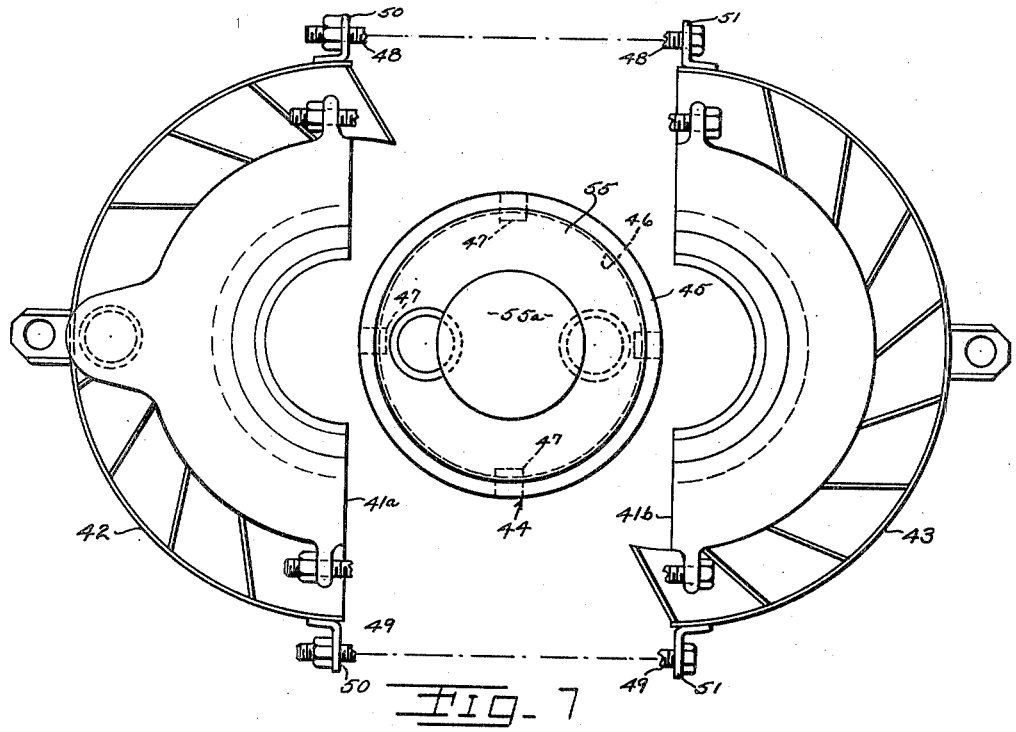
Fig. 7 is a top plan view of a modification having convenient constructional features.
Figure 8:
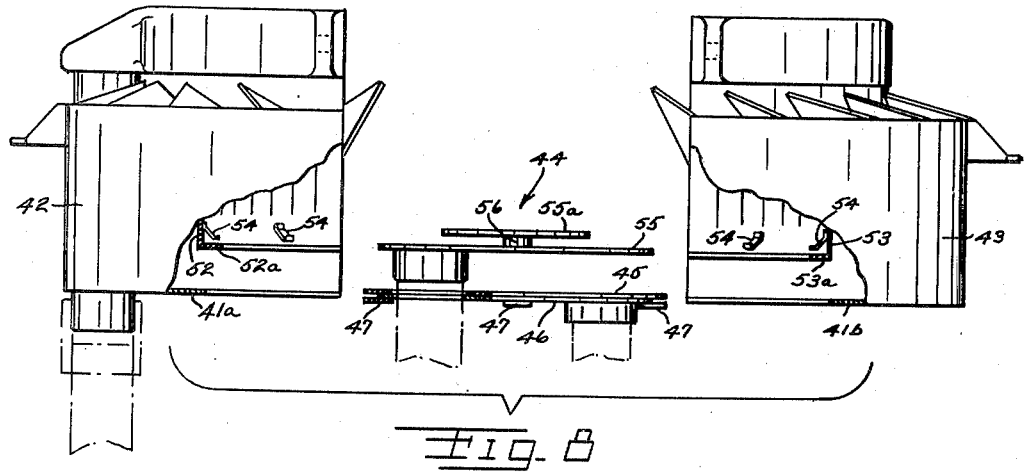
Fig. 8 is a side elevation of the embodiment shown in Fig. 7.

Figs. 7 and 8 are views showing a convenient arrangement for assembling or disassembling our purifier. As will appear, the main housing is split on a vertical axial plane, and the floor elements are made in readily fitted parts. The said floor elements include two semi-annular portions 41a and 41b, carried by the respective semi-cylindrical walls 42 and 43. The remainder of the floor, constituting the central portion 44 when assembled, includes a top plate 45 of circular shape, another plate 46 of smaller diameter fixed to plate 45, and four equi-spaced tabs 47 attached to plate 46. The floor portions 41a and 41b slide in between tabs 47 and plate 45 and abut plate 46 when the two portions 42 and 43 are brought together. When so assembled the bolts 48 and 49 hold the two halves of the purifier together, since they pass through the lugs 50 and 51 on halves 42 and 43 respectively.

The inner semicylinders 52 and 53 (corresponding to cylinder 22 in the embodiment of Figs. 1 to 6) have inturned flanges 52a and 53a, and just above said flanges, and projecting inwardly from the walls 52 and 53, are a spaced plurality of spring fingers 54. The inner bottom plate 55 (corresponding to the plate 24 in Figs. 1 to 6) is slidably retained around its edge between the fingers 54 and the flanges 52a and 53a.

A secondary inner bottom plate 55a (corresponding to the plate 24a in Figs. 1 to 6) is supported from plate 55 by the central pillar 56. All parts shown in Figs. 7 and 8 may be carried through the usual manways in tank or boiler walls, and the purifier very readily assembled within the tank.

While in the embodiment shown the first whirling motion imparted to the gaseous stream by the vanes 19, and the second whirling motion imparted by the louvers 29 are oriented in the same direction, as viewed from the same point, either above or below the device, we contemplate the utilization of the invention in a structure wherein the two aforesaid whirling motions are oriented in opposed directions by suitable alteration either of the vanes or the louvers.

What we claim is:

1. Apparatus for the separation of entrained material from a gaseous stream comprising an outer cup shaped member having an outer imperforate peripheral side wall and an outer bottom wall, an inner cup shaped member having an inner peripheral side wall and inner bottom wall, said members being coaxial, but the inner member being spaced inwardly at side and bottom from the outer member to define therebetween an outer chamber having an annular entrance, means affording an outlet passage to remove entrained material from said outer chamber, an inner chamber within said inner member, means affording an outlet passage to remove entrained material from said inner chamber, whirl-promoting means in the entrance to the outer chamber to impart whirling movement to an entering gaseous stream, a second whirl-promoting perforate means in the inner peripheral wall to impart whirling movement to said gaseous stream as it passes through said perforate means to said inner chamber, and entrained material separating means surrounding a discharge aperture from said inner chamber, said whirl-promoting and material separating means combining to successively remove respective fractional portions of entrained material from said gaseous stream.

2. Apparatus as defined in claim 1 wherein said inner chamber has therein an effective free space of greater volume than said entrance whereby to provide a pressure-drop area, so as to induce precipitation of entrained material from the gaseous stream passing therethrough.

3. Multistage apparatus for the separation of entrained material from a gaseous stream comprising an outer chamber enclosed by a cylindrical imperforate outer wall and an outer bottom wall, an inner chamber within said outer chamber and enclosed by a cylindrical inner wall and an inner bottom wall, said cylindrical inner wall being spaced inwardly from and coaxial with said cylindrical outer wall to define therebetween an annular entrance space, and said inner bottom wall being spaced upwardly from said outer bottom wall, means for supporting all said walls in said spaced relationship, a whirl-promoting series of vanes circumferentially disposed in the annular space between said inner and outer cylindrical walls near the upper end thereof whereby a gaseous stream entering said outer chamber between said vanes is whirled around said outer chamber and downwardly therein, means for affording an outlet passage for entrained material centrifugally expelled in said outer chamber, a whirl promoting series of louvers in said inner cylindrical wall whereby the aforesaid stream of gas entering said inner chamber through said louvers is whirled around said inner chamber and upwardly through the open top thereof, means affording an outlet passage for entrained material centrifugally expelled in said inner chamber, means surrounding said open top comprising an annular passage above said inner cylindrical wall and having a peripheral lip overhanging said open top whereby remaining entrained material in said gaseous stream is thrown centrifugally into said annular passage, and means affording an escape outlet for said entrained material from said annular passage.

4. Apparatus as defined in claim 3 wherein an additional plate is provided within said inner chamber, spaced upwardly from said inner bottom plate and supported therefrom.

5. Multi-stage apparatus for the separation of entrained material from a gaseous stream comprising a pair of nested cup-shaped receptacles coaxilly disposed in spaced relationship, and consisting of an outer receptacle having a cylindrical imperforate outer wall and a disk-shaped outer bottom wall, and an inner receptacle having a cylindrical inner wall and a disk shaped inner bottom wall, a cylindrical intermediate wall extending inwardly into the annular space between said cylindrical outer and inner walls, an outer chamber between said cup shaped receptacles consisting of said annular space providing an entrance to said outer chamber and a relatively unobstructed area between said outer and inner bottom walls, an inner chamber within said inner receptacle, respective means for affording an outlet for entrained material from said outer and inner chambers, a first whirl-promoting means in the space between said intermediate cylindrical wall and said outer cylindrical wall whereby a gaseous stream entering said outer chamber through the last said space is whirled around the periphery of said outer chamber and downwardly towards the bottom thereof, a second whirl promoting means in said inner cylindrical wall consisting of a circumferentially spaced series of apertures whereby said gaseous stream entering said inner chamber from said outer chamber is whirled around the periphery of said inner chamber, and upwardly towards the top thereof, an outlet for said gaseous stream at the top of said inner chamber, and entrained material separating means surrounding a discharge aperture from said outlet whereby remaining entrained material is separated from said stream.

6. Apparatus as defined in claim 5 wherein said first whirl-promoting means consists of a circumferential equi-spaced series of vanes, arranged in windmill pattern, and extending between said outer cylindrical wall and said intermediate cylindrical wall.

7. Apparatus as defined in claim 5 wherein said second whirl-promoting means consists of a series of spaced louvers extending circumferentially around said inner cylindrical wall.

8. Apparatus as defined in claim 5 wherein an inner baffle plate is provided in said inner chamber disposed above and parallel to said inner bottom plate, but spaced upwardly therefrom.

9. Apparatus as defined in claim 5 wherein said material separating means surrounding said outlet consists of walls defining an annular passage opening inwardly towards said outlet, the outer portion of such last named walls having a peripheral lip overhanging said opening whereby any entrained material still remaining in said gaseous stream is thrown centrifugally into said annular passage, and means affording an escape outlet for such entrained material from said annular passage.

10. Apparatus as defined in claim 1 wherein said second whirl promoting means is disposed to produce in the gaseous stream a whirling direction oriented similarly to the whirling motion of the gaseous stream caused by the first said whirl promoting means.

11. Apparatus as defined in claim 3 wherein the louvers are angularly disposed to maintain the whirling direction of the gaseous stream as it proceeds from the outer chamber to the inner chamber.

12. Apparatus as defined in claim 5 wherein said first whirl promoting means and said second whirl promoting means are disposed to guide said gaseous stream into similarly oriented vortices.

References Cited in the file of this patent

UNITED STATES PATENTS

| | | |
|---|---|---|
| 1,264,263 | Brassert | Apr. 30, 1918 |
| 1,539,435 | Schutz | May 26, 1925 |
| 1,684,020 | Hawley | Sept. 11, 1928 |
| 1,748,286 | Hawley | Feb. 25, 1930 |
| 1,896,894 | Hawley | Feb. 7, 1933 |
| 2,075,264 | Bourne et al. | Mar. 30, 1937 |
| 2,298,242 | Wegmann | Oct. 6, 1942 |